United States Patent
Jarrier et al.

(10) Patent No.: US 8,661,831 B2
(45) Date of Patent: Mar. 4, 2014

(54) ADAPTIVE GAS TURBINE VANE SEPARATOR SYSTEM AND METHOD

(75) Inventors: Etienne Rene Jarrier, Alton (GB);
Simon Larcombe, Alton (GB)

(73) Assignee: BHA Altair, LLC, Franklin, TN (US)

( * ) Notice: Subject to any disclaimer, the term of this patent is extended or adjusted under 35 U.S.C. 154(b) by 1085 days.

(21) Appl. No.: 12/688,345

(22) Filed: Jan. 15, 2010

(65) Prior Publication Data
US 2011/0173986 A1 Jul. 21, 2011

(51) Int. Cl.
*F02C 1/00* (2006.01)
*F02G 3/00* (2006.01)
*B01D 41/00* (2006.01)

(52) U.S. Cl.
USPC ............................ 60/772; 60/39.092; 55/422

(58) Field of Classification Search
USPC ............... 55/DIG. 17, 385.3, 400, 422, 440; 95/10, 277; 60/39.092, 39.23, 240, 60/336, 772, 779
See application file for complete search history.

(56) References Cited

U.S. PATENT DOCUMENTS

| 3,308,873 | A | * | 3/1967 | Dotto ..................... 160/176.1 P |
| 3,550,357 | A | * | 12/1970 | Bowen et al. .................. 96/397 |
| 3,853,514 | A | * | 12/1974 | Post .............................. 96/230 |
| 5,104,431 | A | | 4/1992 | Fewel, Jr. |
| 5,137,555 | A | | 8/1992 | Fewel, Jr. |
| 5,269,823 | A | | 12/1993 | Wurz |
| 5,653,786 | A | | 8/1997 | Taylor et al. |
| 6,123,751 | A | | 9/2000 | Nelson et al. |
| 6,315,804 | B1 | | 11/2001 | Bradley |
| 2003/0177755 | A1 | * | 9/2003 | Shingu et al. ............. 60/39.092 |
| 2007/0089425 | A1 | * | 4/2007 | Motter et al. .................. 60/775 |

* cited by examiner

*Primary Examiner* — Gerald L Sung
*Assistant Examiner* — Scott Walthour
(74) *Attorney, Agent, or Firm* — Reinhart Boerner Van Deuren P.C.

(57) ABSTRACT

An adaptive vane separator system is provided for use with an inlet filter house of a gas turbine engine system. The vane separator system is coupled to the inlet filter house. The vane separator system includes a slide rail and a plurality of vanes rotatably coupled to the slide rail. The inlet filter house is configured to channel air to an air inlet of a turbine engine. A drive motor is coupled to the vane separator system. The drive motor is operable to selectively move at least one of the vanes to facilitate reducing an amount of moisture channeled through the air inlet.

18 Claims, 2 Drawing Sheets

ADAPTIVE GAS TURBINE VANE SEPARATOR SYSTEM AND METHOD

BACKGROUND OF THE INVENTION

The subject matter disclosed herein relates generally to turbine engines and, more particularly, to a vane separator system for use with a turbine engine.

At least some known turbine engines include an air inlet, a core engine, and an exhaust flue. Within at least some known turbine engines, continued exposure to incoming precipitation and/or other moisture may eventually produce corrosion and/or other damage to the turbine engine. To prevent precipitation and/or other moisture from entering the turbine engine, at least some known turbine engines include a vane separator system that separates the particles, precipitation, and/or other moisture from the air entering the air inlet. Although such systems generally remove moisture from the air entering the air inlet, known vane separator systems may reduce air flow to the turbine engine. Performance and/or operating efficiency of the turbine engine may decrease depending on the severity of the reduced air flow caused by known vane separator systems. Furthermore, there are at least some environmental conditions during which the vane separators are not required and any reduction in air flow is undesirable.

BRIEF DESCRIPTION OF THE INVENTION

In one aspect, a method is provided for selectively using a turbine engine system. A vane separator system is coupled to an inlet filter house of a turbine engine. The vane separator system includes a slide rail and a plurality of vanes rotatably coupled to the slide rail. The inlet filter house is configured to channel air to an air inlet of the turbine engine. A drive motor is coupled to the vane separator system. The drive motor is operable to selectively move at least one of the vanes to facilitate reducing an amount of moisture entering through the air inlet.

In another aspect, a vane separator system is provided for use with an inlet filter house. The vane separator system includes a slide rail, a plurality of vanes, and a drive motor. The slide rail has a longitudinal axis. The vanes are rotatably coupled to the slide rail. At least one of the vanes is configured to move along the longitudinal axis of the slide rail. The drive motor is coupled to the slide rail. The drive motor is operable to selectively move at least one of the vanes along the longitudinal axis of the slide rail.

In yet another aspect, a turbine engine system is provided. The turbine engine system includes a turbine engine, an inlet filter house including an air duct defined therein, a vane separator system, and a drive motor. The air duct is configured to channel air into the turbine engine. The vane separator system is coupled to the inlet filter house. The vane separator system includes a slide rail and a plurality of vanes rotatably coupled to the slide rail. At least one of the vanes is configured to move along a longitudinal axis of the slide rail. The drive motor is coupled to the slide rail. The drive motor is operable to selectively move at least one of the vanes along the longitudinal axis of the slide rail.

DETAILED DESCRIPTION OF THE INVENTION

The methods and systems described herein include a gas turbine engine including an adaptive gas turbine vane separator system. The vane separator system is selectively actuatable to reduce an amount of precipitation and/or other moisture from entering a gas turbine engine. Additionally, the vane separator system is selectively retractable to reduce a pressure loss of the gas turbine engine.

Figure 1:
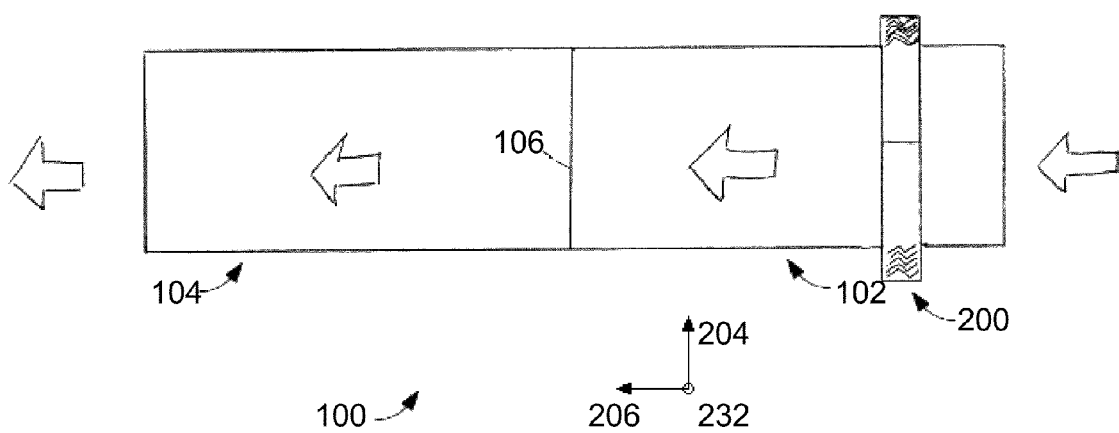
FIG. 1 is a schematic illustration of an exemplary turbine engine inlet filter house.

FIG. 1 is a schematic illustration of an exemplary gas turbine engine system 100 that includes an inlet filter house 102 and a gas turbine engine 104. In the exemplary embodiment, inlet filter house 102 includes a vane separator system 200, described in further detail below. In the exemplary embodiment, vane separator system 200 is oriented such that vane separator system 200 is substantially perpendicular to air duct 202. More specifically, in the exemplary embodiment, vane separator system 200 has a longitudinal axis that extends generally along an X-axis 204, and air duct 202 has a longitudinal axis that extends generally along a Y-axis 206.

During operation, in the exemplary embodiment, ambient air flows into inlet filter house 102, wherein the ambient air is filtered. In the exemplary embodiment, the filtered air is channeled downstream through an air inlet 106 towards gas turbine engine 104.

Figure 2:
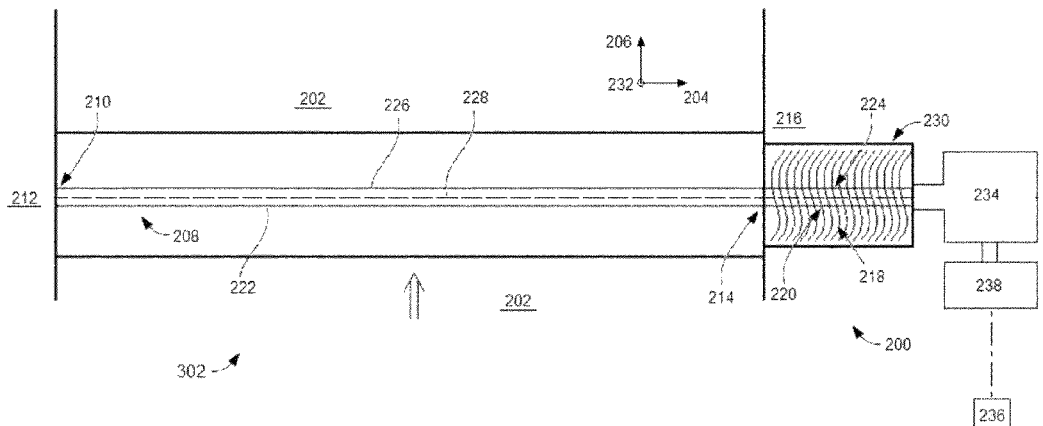
FIG. 2 is a schematic view of an exemplary vane separator system, in a retracted configuration, that may be used with the turbine engine shown in FIG. 1.
Figure 3:
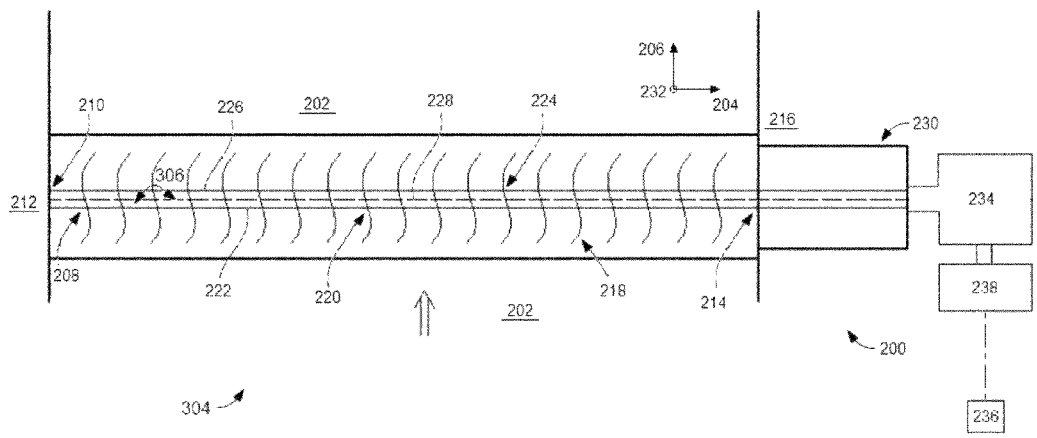
FIG. 3 is a schematic view of the vane separator system shown in FIG. 2 in an expanded configuration.

FIGS. 2 and 3 are each schematic illustrations of vane separator system 200. More specifically, FIG. 2 is a schematic illustration of vane separator system 200 in a retracted or unactuated configuration 302, and FIG. 3 is a schematic illustration of vane separator system 200 in an expanded or actuated configuration 304. In the exemplary embodiment, vane separator system 200 is positioned within an air duct 202 that channels ambient air towards gas turbine engine 104. Vane separator system 200 may be included as an integral component in a newly installed construction of inlet filter house 102 and/or may be retrofitted into existing inlet filter houses 102.

In the exemplary embodiment, vane separator system 200 includes a slide rail 208 that extends generally along X-axis 204. More specifically, in the exemplary embodiment, a first end 210 of slide rail 208 is coupled to a first side 212 of air duct 202 and a second end 214 of slide rail 208 is coupled to an opposing second side 216 of air duct 202.

In the exemplary embodiment, vane separator system 200 includes a plurality of vanes 218 that facilitate restricting precipitation, particulates, and/or other moisture from entering gas turbine engine 104 via air duct 202. In the exemplary embodiment, vanes 218 have a generally aerodynamic shape that enables channeling air through air duct 202 with relatively little resistance while creating a resistance suitable to facilitate removing liquid from air channeled through air duct 202 through impingement. More specifically, in the exemplary embodiment, each vane 218 has an S-shaped cross-sectional profile.

In the exemplary embodiment, vanes 218 are each coupled to slide rail 208 such that adjacent vanes are selectively movable to be a distance apart that enables channeling air through air duct 202. In the exemplary embodiment, slide rail includes an upstream portion 222, a downstream portion 226, and a guide rail 228. In the exemplary embodiment, each vane 218 includes a first portion 220 that is coupled to upstream portion 222 of slide rail 208 and a second portion 224 that is coupled to downstream portion 226 of slide rail 208.

Vanes 218 are movable along slide rail 208 and, more specifically, guide rail 228 along X-axis 204 such that a relative lateral position of vanes 218 is selectively variable. More specifically, vanes 218 are translatable between retracted configuration 302 and expanded configuration 304 to facilitate controlling an amount of air filtered by vanes 218. In the exemplary embodiment, when vanes 218 and fully retracted, vanes 218 are not positioned between air duct first side 212 and air duct second side 216. Moreover, in the exemplary embodiment, when vanes 218 are fully expanded, vanes 218 are spaced substantially evenly between air duct first side 212 and air duct second side 216.

In retracted configuration 302, vanes 218 are retracted into at least one housing 230 positioned remotely from air duct 202 to permit maximum air flow to gas turbine engine 104. In expanded configuration 304, vanes 218 facilitate reducing an amount of precipitation and/or other moisture entering gas turbine engine 104 via air duct 202. To move vanes 218 along guide rail 228 between the retracted and expanded configurations 302 and 304, first portion 220 is moved at a substantially similar rate as second portion 220.

Additionally, in the exemplary embodiment, slide rail 208 may rotate vanes 218 about a Z-axis 232, as indicated by arrow 306, to adjust a pitch angle of vanes 218. More specifically, vanes 218 are rotatable between an open configuration and a closed configuration to further facilitate controlling an amount of air filtered by vanes 218. The air resistance within air duct 202 when vanes 218 are in the open configuration is less than the air resistance within air duct 202 when vanes 218 are in the closed configuration. In the exemplary embodiment, vanes 218 are pivotable about a point on guide rail 228. More specifically, in the exemplary embodiment, vanes 218 are rotatable substantially 90° in both the clockwise and the counterclockwise direction from the open configuration.

In the open configuration, vanes 218 are positioned such that each vane 218 is substantially parallel to an orientation of air duct 202 and/or to a direction air channeled through air duct 202, i.e., substantially parallel to Y-axis 206. In the closed configuration, vanes 218 are positioned such that each vane 218 is substantially perpendicular to an orientation of air duct 202 and/or to a direction air is channeled through air duct 202, i.e., substantially perpendicular to Y-axis 206. To rotate vanes 218 between the open and closed configurations about Z-axis 232, as indicated by arrow 306, first and second portions 220 and 224 are moved at different rates. For example, when slide rail 208 moves first portion 220 towards first end 210 at a rate that is greater than a rate of movement of second portion 224, vanes 218 rotate in a counterclockwise direction. Conversely, when slide rail 208 moves first portion 220 towards second end 214 at a rate that is greater than a rate of movement of second portion 224, vanes 218 rotate in a clockwise direction.

In the exemplary embodiment, vane separator system 200 includes a drive motor 234 that is coupled to slide rail 208. Drive motor 234 is configured to actuate slide rail 208 and, more specifically, upstream portion 222 and downstream portion 226, to move vane 218 and, more specifically, first portion 220 and second portion 224. In the exemplary embodiment, drive motor 234 is configured to independently actuate upstream and downstream portions 222 and 226 such that vanes 218 may be independently moved along X-axis 204 and/or rotated about Z-axis 232.

Vanes 218 may be adjusted using any suitable structure, configuration, arrangement, means, and/or components, whether described and/or illustrated herein, such as, but not limited to, systems using electrical motors, hydraulic cylinders, springs, and/or servomechansims. Moreover, slide rail 208 and/or drive motor 234 may be actuated by any suitable means, whether described and/or illustrated herein, including, without limitation, hydraulic fluid, electrical power, electro-chemical power, and/or mechanical power, such as spring force.

In the exemplary embodiment, vane separator system 200 includes a sensor 236 that detects a parameter including an ambient precipitation, an ambient humidity, and/or other ambient moisture. In the exemplary embodiment, sensor 236 is coupled in communication to a controller 238 such that signals may be transmitted from sensor 236 to controller 238 for use in processing within controller 238.

In the exemplary embodiment, controller 238 includes a processor that is programmed to perform the methods and/or steps described herein. Further, other components described herein may include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and/or a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Executable instructions may include, without limitation, instructions for moving vanes 218 along X-axis 204 between the retracted and expanded configurations 302 and 304 and/or instructions for rotating vanes 218 about Z-axis 232 between the open configuration and the closed configuration. The execution of sequences of instructions is not limited to any specific combination of hardware circuitry and software instructions.

In the exemplary embodiment, controller 238 is coupled in communication to drive motor 234 for generally monitoring and controller operation of gas turbine engine system 100 and/or some or all of the components thereof. More specifically, in the exemplary embodiment, controller 238 is configured to control drive motor 234 to actuate slide rail 208 based on the parameters detected by sensor 236. For example, when sensor 234 does not detect an ambient moisture, controller 238 controls drive motor 234 to actuate slide rail 208 for moving vanes 218 towards retracted configuration 302. Conversely, when sensor 234 detects an ambient moisture, controller 238 controls drive motor 234 to actuate slide rail 208 for moving vanes 218 towards expanded configuration 304.

Exemplary embodiments of the adaptive gas turbine vane separator system and methods for selectively using a gas turbine engine including the adaptive gas turbine vane separator system are described above in detail. The methods and systems are not limited to the specific embodiments described herein, but rather, steps of the methods and/or components of the systems may be utilized independently and separately from other steps and/or components described herein. For example, the methods and systems described herein may have other industrial and/or consumer applications and are not limited to practice with gas turbine engines as described herein. Rather, the present invention can be implemented and utilized in connection with other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for selectively using a turbine engine system, said method comprising:
    coupling a vane separator system to an inlet filter house of a turbine engine, the vane separator system including a slide rail and a plurality of vanes rotatably coupled to the slide rail, wherein the inlet filter house is configured to channel air to an air inlet of the turbine engine; and
    coupling a drive motor to the vane separator system, wherein the drive motor is operable to selectively move at least one of the plurality of vanes between a retracted configuration and an expanded configuration to facilitate reducing an amount of moisture entering through the air inlet, wherein in the retracted configuration the plurality of vanes are isolated from the air channeled to the air inlet of the turbine engine.

2. A method in accordance with claim 1 further comprising coupling a sensor to the drive motor, wherein the sensor is configured to detect a moisture of air channeled through the inlet filter house, wherein the drive motor is configured to actuate the slide rail based on the moisture detected by the sensor.

3. A method in accordance with claim 2 further comprising coupling a controller to the sensor and to the drive motor, wherein the controller is configured to actuate the drive motor based on the moisture detected by the sensor.

4. A method in accordance with claim 1 wherein coupling a vane separator system further comprises orienting at least one of the plurality of vanes to be rotatable about an axis that is substantially perpendicular to a longitudinal axis of the slide rail.

5. A method in accordance with claim 1 further comprising coupling a housing to the slide rail, wherein the plurality of vanes are configured to be selectively stored in the housing when in the retracted configuration.

6. A method in accordance with claim 1, wherein coupling a vane separator system further comprises coupling the vane separator system to the turbine engine such that a longitudinal axis of the slide rail is substantially perpendicular to a longitudinal axis of the inlet filter house.

7. A vane separator system for use with an inlet filter house, said vane separator system comprising:
    an inlet filter house for a gas turbine comprising a duct;
    a slide rail having a longitudinal axis;
    a plurality of vanes rotatably coupled to said slide rail, wherein at least one of said plurality of vanes is configured to move along the longitudinal axis of said slide rail; and
    a drive motor coupled to said slide rail, wherein said drive motor is operable to selectively move at least one of said plurality of vanes along the longitudinal axis of said slide rail between a retracted configuration and an expanded configuration, wherein in the retracted configuration the plurality of vanes are positioned remotely from said duct.

8. A vane separator system in accordance with claim 7 further comprising a sensor coupled to said drive motor, wherein said sensor is configured to detect an ambient moisture, and wherein said drive motor is configured to actuate said slide rail based on the ambient moisture detected by said sensor.

9. A vane separator system in accordance with claim 8 further comprising a controller coupled to said sensor and to said drive motor, wherein said controller is configured to actuate said drive motor based on the ambient moisture detected by said sensor.

10. A vane separator system in accordance with claim 7, wherein at least one of said plurality of vanes is rotatable about an axis that is substantially perpendicular to the longitudinal axis of said slide rail.

11. A vane separator system in accordance with claim 7 further comprising a housing positioned remote from the duct of the inlet filter house, wherein said housing is configured to selectively store said plurality of vanes when said plurality of vanes is in the retracted configuration.

12. A vane separator system in accordance with claim 7, wherein the longitudinal axis of said slide rail is substantially perpendicular to a longitudinal axis of an air duct of the inlet filter house.

13. A turbine engine system comprising:
    a turbine engine;
    an inlet filter house including an air duct defined therein, said air duct configured to channel air into said turbine engine;
    a vane separator system coupled to said inlet filter house, wherein said vane separator system comprises a slide rail and a plurality of vanes rotatably coupled to said slide rail, wherein at least one of said plurality of vanes is configured to move along a longitudinal axis of said slide rail; and a drive motor coupled to said slide rail, wherein said drive motor is operable to selectively move at least one of said plurality of vanes along the longitudinal axis of said slide rail between a retracted configuration and an expanded configuration, wherein in the retracted configuration the plurality of vanes are isolated from the air being channeled through said air duct.

14. A turbine engine system in accordance with claim 13 further comprising a sensor coupled to said drive motor, wherein said sensor is configured to detect a moisture of air channeled through said air duct, wherein said drive motor is configured to actuate said slide rail based on the moisture detected by said sensor.

15. A turbine engine system in accordance with claim 14 further comprising a controller coupled to said sensor and to said drive motor, wherein said controller is configured to actuate said drive motor based on the moisture detected by said sensor.

16. A turbine engine system in accordance with claim 13, wherein at least one of said plurality of vanes is rotatable about an axis that is substantially perpendicular to the longitudinal axis of said slide rail.

17. A turbine engine system in accordance with claim 13 further comprising a housing positioned remote from said air duct, wherein said housing is configured to selectively store said plurality of vanes when said plurality of vanes is in the retracted configuration.

18. A turbine engine system in accordance with claim 13, wherein the longitudinal axis of said slide rail is substantially perpendicular to a longitudinal axis of said air duct.

\* \* \* \* \*